(12) United States Patent
Sorstedt et al.

(10) Patent No.: US 10,532,740 B2
(45) Date of Patent: Jan. 14, 2020

(54) METHOD AND ARRANGEMENT FOR MONITORING AND ADAPTING THE PERFORMANCE OF A FUSION SYSTEM OF AN AUTONOMOUS VEHICLE

(71) Applicant: VOLVO CAR CORPORATION, Gothenburg (SE)

(72) Inventors: Joakim Lin Sorstedt, Gothenburg (SE); Daniel Svensson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 310 days.

(21) Appl. No.: 15/467,297

(22) Filed: Mar. 23, 2017

(65) Prior Publication Data
US 2017/0297571 A1  Oct. 19, 2017

(30) Foreign Application Priority Data
Apr. 14, 2016 (EP) .................................... 16165223

(51) Int. Cl.
*B60W 30/095* (2012.01)
*G05D 1/02* (2006.01)
(Continued)

(52) U.S. Cl.
CPC .......... *B60W 30/095* (2013.01); *B60W 40/04* (2013.01); *B60W 50/14* (2013.01);
(Continued)

(58) Field of Classification Search
CPC ........... B60W 30/095; B60W 2750/30; B60W 2600/00; B60W 2550/30; B60W 50/14;
(Continued)

(56) References Cited

U.S. PATENT DOCUMENTS 6,718,259 B1 * 4/2004 Khosla .................. G01C 21/26
340/435
8,458,715 B1 * 6/2013 Khosla ..................... G06F 9/50
718/104
(Continued)

FOREIGN PATENT DOCUMENTS

EP  2865575  4/2015

OTHER PUBLICATIONS

Extented European Search Report for European Application No. EP 16165223.5, Completed by the European Patent Office, dated Nov. 16, 2016, 14 Pages.

*Primary Examiner* — Alan D Hutchinson
(74) *Attorney, Agent, or Firm* — Brooks Kushman P.C.

(57) ABSTRACT

Disclosed herein is a method and arrangement for monitoring and adapting the performance of a fusion system of an autonomous road vehicle. A drivable area is determined by combining a localization function and high density map data. Information on surrounding objects is determined, comprising determining the localization and classifying the surrounding objects, estimating their physical property states, and assigning them extension descriptions. Information on the drivable area and surrounding objects is condensed into observed areas, monitored by sensors of the environmental perception function with a predetermined degree of certainty, and prioritized objects, represented by classes, state estimates and extension descriptions. Having the fusion system monitor itself retrospectively by evaluating its current determinations of drivable area, prioritized objects and observed areas against its previous determinations thereof, and if a previous determination differ more than a predetermined amount from a current determination, adapting the fusion system to account for that discrepancy.

13 Claims, 4 Drawing Sheets

(51) Int. Cl.
*B60W 40/04* (2006.01)
*B60W 50/14* (2012.01)
*G01S 7/295* (2006.01)
*G01S 13/93* (2006.01)
*G01S 13/86* (2006.01)
*G05D 1/00* (2006.01)
*G06N 5/04* (2006.01)
*G06N 7/00* (2006.01)

(52) U.S. Cl.
CPC .............. *G01S 7/295* (2013.01); *G01S 13/86* (2013.01); *G01S 13/931* (2013.01); *G05D 1/0088* (2013.01); *G05D 1/0248* (2013.01); *G05D 1/0274* (2013.01); *G05D 1/0278* (2013.01); *G06N 5/048* (2013.01); *G06N 7/005* (2013.01); *B60W 2550/30* (2013.01); *B60W 2550/402* (2013.01); *B60W 2600/00* (2013.01); *B60W 2750/30* (2013.01); *G05D 2201/0213* (2013.01)

(58) Field of Classification Search
CPC ............. B60W 40/04; B60W 2550/402; G01S 13/931; G01S 7/295; G01S 13/86; G06N 7/005; G06N 5/048; G05D 2201/0213; G05D 1/0278; G05D 1/0088; G05D 1/0274; G05D 1/0248
See application file for complete search history.

(56) References Cited

U.S. PATENT DOCUMENTS

| | | |
|---|---|---|
| 9,268,938 B1 * | 2/2016 | Aguayo Gonzalez ..................... G01R 21/00 |
| 9,274,525 B1 | 3/2016 | Ferguson et al. |
| 2005/0021201 A1 * | 1/2005 | Klotz ................... B60W 30/16 702/189 |
| 2013/0179382 A1 * | 7/2013 | Fritsch ................... G06N 7/005 706/46 |
| 2017/0291544 A1 * | 10/2017 | Ishihara ................... B60Q 9/00 |

* cited by examiner

METHOD AND ARRANGEMENT FOR MONITORING AND ADAPTING THE PERFORMANCE OF A FUSION SYSTEM OF AN AUTONOMOUS VEHICLE

CROSS-REFERENCE TO RELATED APPLICATIONS

This application claims foreign priority benefits under 35 U.S.C. § 119(a)-(d) to European patent application number EP 16165223.5, filed Apr. 14, 2016, which is incorporated by reference in its entirety.

TECHNICAL FIELD

The present disclosure relates to a method for monitoring and adapting the performance of a fusion system of an autonomous road vehicle equipped with an autonomous drive system comprising a positioning system and multiple sensors for supervising the internal state of the autonomous road vehicle and the surrounding environment. The disclosure further relates to an arrangement for monitoring and adapting the performance of a fusion system of an autonomous road vehicle equipped with an autonomous drive system comprising a positioning system and multiple sensors for supervising the internal state of the autonomous road vehicle and the surrounding environment. The disclosure further relates to an autonomous road vehicle that comprises such an arrangement for monitoring and adapting the performance of a fusion system thereof.

BACKGROUND

One area of automotive vehicle technology that is evolving rapidly is the area of autonomous or semi-autonomous drive capabilities for road vehicles. This is enabled through the introduction of sensors, for sensing vehicle motion and surroundings, and actuators, for controlling different road vehicle functionalities, such as steering, throttling and braking. Increased on-board data processing capabilities ties together these sensors and actuators such that autonomous or semi-autonomous drive capabilities are enabled.

When a road vehicle runs in autonomous mode, which means the driver is not required to perform maneuvers, the road vehicle usually is dependent on multiple data sources as inputs to perform the autonomous driving. An autonomous road vehicle uses information about the surrounding environment to drive safely. For instance, a detailed description of the road network inside of which it is operating is used by the autonomous road vehicle to cautiously navigate and plan future trajectories. It should also detect and classify surrounding objects, and estimate their physical properties such as positions, velocities and accelerations. To perform such tasks, autonomous road vehicles are usually provided high density map information and information from multiple sensors measuring both the internal state of the ego vehicle as well as the surrounding environment.

Compared to safety systems available for non-autonomous road vehicles on the market today, an autonomous self-driving road vehicle should be much more reliable, and have a near zero tolerance for serious errors. To accomplish this level of accuracy and reliability, a high degree of sensor redundancy is necessary. This is commonly accomplished through fusing data from multiple sources to provide environmental perception and localization functions where the different functions and algorithms that use sensor data to estimate the information used for enabling reliable autonomous travel are collectively referred to as a fusion system.

Although such fusion systems are known to be used for enabling autonomous travel of road vehicles there is still room for improving the performance of such fusion systems.

SUMMARY

Embodiments herein aim to provide an improved method for monitoring and adapting the performance, and thus also safety, of a fusion system of an autonomous road vehicle equipped with an autonomous drive system comprising a positioning system and multiple sensors for supervising the internal state of the autonomous road vehicle and the surrounding environment.

This is provided through a method where a localization function of the fusion system is provided by fusing data from the positioning system and the sensors; an environmental perception function of the fusion system is provided by fusing data from the sensors supervising the surrounding environment; and where the localization and environmental perception functions of the fusion system are implemented using parallel algorithms based on alternative concepts and using different sets of sensor information, and where the method further comprises: determining a drivable area in front of the autonomous road vehicle by combining the localization function and high density map data for a current position; determining information on surrounding objects, the information determination comprising determining the localization of the surrounding objects, classifying the surrounding objects, estimating their physical property states, and assigning them extension descriptions and a highly automated drive confidence; condensing information on the drivable area and surrounding objects into observed areas and prioritized objects, specifying observed areas as the volume around the autonomous road vehicle that has been monitored by the sensors of the environmental perception function with a predetermined degree of certainty, and representing prioritized objects by classes, state estimates, extension descriptions and highly automated drive confidences; and having the fusion system monitor itself retrospectively by evaluating its current determinations of drivable area, prioritized objects and observed areas against its previous determinations thereof, and if a previous determination differ more than a predetermined amount from a current determination, adapting the fusion system to account for that discrepancy.

According to a second aspect is provided that the drivable area in front of the autonomous road vehicle is determined as an area that belongs to a road traveled, which, given sensor and algorithmic uncertainties, is considered safe with a predetermined probability.

The provision of determining the drivable area as an area that belongs to a road traveled which is considered safe with a predetermined probability as above allows for efficient monitoring and adaptation of the fusion system by comparing current and retrospective determinations of drivable area.

According to a third aspect is provided that the determination of information on surrounding objects comprises classifying surrounding objects with respect to object types, estimating physical property states of surrounding objects including their positions, velocities and accelerations, and assigning the surrounding objects extension descriptions that include sensor uncertainty descriptions.

The provision of classifying surrounding objects, estimating their physical property states and assigning them extension descriptions as above provides basis for performing efficient comparisons and evaluations of surrounding objects.

According to a fourth aspect is provided that it further comprises determining if a current determination of a class of a prioritized object differs from a previously determined class of that prioritized object, and if so adapting the fusion system by increasing a sensor uncertainty description associated with that previously determined class.

The provision of comparing a current and a retrospective determination of a class of a prioritized object as above provide an efficient way of ascertaining the correctness of sensor determinations.

According to a fifth aspect is provided that it further comprises determining if a current localization determination of a prioritized object differ from a previous localization determination of that prioritized object more than what a reasonable estimate based on its previous representation would indicate but indicates a localization in a predetermined close vicinity thereto, and if so adapting the fusion system by increasing a sensor uncertainty description associated with that prioritized object.

The provision of adapting the fusion system as above after comparing a current and a retrospective localization determination of a prioritized object as above provides an efficient way of ascertaining the correctness of sensor based localization determinations.

According to a sixth aspect is provided that it further comprises determining if a current localization determination of a prioritized object differ from a previous localization determination of that prioritized object more than what a reasonable estimate based on its previous representation would indicate and not indicates a localization in a predetermined close vicinity thereto, and if so adapting the fusion system by distrusting the fusion system and initiating hand-over of control of the autonomous road vehicle from the autonomous drive system to a driver thereof.

The provision of distrusting the fusion system as above after comparing a current and a retrospective localization determination of a prioritized object as above provides an efficient way of determining and handling a fault in the fusion system.

According to a seventh aspect is provided that it comprises determining if a current determination of drivable area indicates a different extension of the drivable area than a previous determination thereof, and if so adapting the fusion system such that future determinations of drivable area are made based on the current determination.

The provision of comparing a current and a retrospective determination of drivable area to see if the current determination indicates a different extension of the drivable area than the previous as above provide an efficient way of improving the drivable area determination.

According to an eight aspect is provided that it comprises determining if a current determination of drivable area indicates a more narrow width of the drivable area than a previous determination thereof, and if so adapting the fusion system such that future determinations of drivable area are made based on a more narrow width of the drivable area than that of the previous determination thereof.

The provision of comparing a current and a retrospective determination of drivable area to see if the current determination indicates a more narrow width than the previous as above provide an efficient way of improving the drivable area determination in cases where a previous determination seemingly overestimated the width.

According to a ninth aspect is provided that it comprises determining if a current determination of drivable area indicates a less narrow width of the drivable area than a previous determination thereof, and if so adapting the fusion system such that future determinations of drivable area are made based on a less narrow width of the drivable area than that of the previous determination thereof.

The provision of comparing a current and a retrospective determination of drivable area to see if the current determination indicates a less narrow width than the previous as above provide an efficient way of improving the drivable area determination in cases where a previous determination seemingly underestimated the width.

According to a tenth aspect is provided that it comprises determining if a current determination of drivable area indicates that the previously determined drivable area was not drivable at all, and if so adapting the fusion system by distrusting the localization function and initiating hand-over of control of the autonomous road vehicle from the autonomous drive system to a driver thereof.

The provision of distrusting the localization function as above after determining that a retrospective determination of drivable area was flawed as above provides an efficient way of determining and handling a fault in the fusion system.

According to an eleventh aspect is provided that it comprises determining if a current determination of surrounding objects indicates that a new object has appeared in an area where it should have been determined previously, and if so adapting the fusion system by distrusting the fusion system and initiating hand-over of control of the autonomous road vehicle from the autonomous drive system to a driver thereof.

The provision of distrusting the fusion system as above after determining that a retrospective determination of surrounding objects was flawed as above provides an efficient way of determining and handling a fault in the fusion system.

According to a twelfth aspect embodiments herein also aim to provide an improved arrangement for monitoring and adapting the performance of a fusion system of an autonomous road vehicle equipped with an autonomous drive system comprising a positioning system and multiple sensors for supervising the internal state of the autonomous road vehicle and the surrounding environment.

This is provided through an arrangement where: a localization function of the fusion system is provided by fusing data from the positioning system and the sensors; an environmental perception function of the fusion system is provided by fusing data from the sensors supervising the surrounding environment; and where the localization and environmental perception functions of the fusion system are implemented using parallel algorithms based on alternative concepts and using different sets of sensor information, and the arrangement further comprising the fusion system being arranged to: determine a drivable area in front of the autonomous road vehicle by combining the localization function and high density map data for a current position; determine information on surrounding objects, the information determination comprising determining the localization of the surrounding objects, classifying the surrounding objects, estimating their physical property states, and assigning them extension descriptions and a highly automated drive confidence; condense information on the drivable area and surrounding objects into observed areas and prioritized objects, specifying observed areas as the volume around the autonomous road vehicle that has been monitored by the sensors of the environmental perception function with a predetermined degree of certainty, and representing prioritized objects by classes, state estimates, extension descriptions and highly automated drive confidences; and the fusion system further being arranged to monitor itself retrospectively by evaluating its current determinations of drivable area, prioritized objects and observed areas against its previous determinations thereof, and if a previous determination differ more than a predetermined amount from a current determination, adapt the fusion system to account for that discrepancy.

According to a final aspect is provided an autonomous road vehicle that comprises an arrangement for monitoring and adapting the performance of a fusion system of an autonomous road vehicle as above.

An autonomous road vehicle as above is able to rely on its fusion system to monitor itself retrospectively, evaluating its current output against its output from an earlier time when it had less information, and adapting the performance of its fusion system based thereupon.

BRIEF DESCRIPTION OF THE DRAWINGS

In the following, embodiments herein will be described in greater detail by way of example only with reference to attached drawings, in which.

Figure 1:
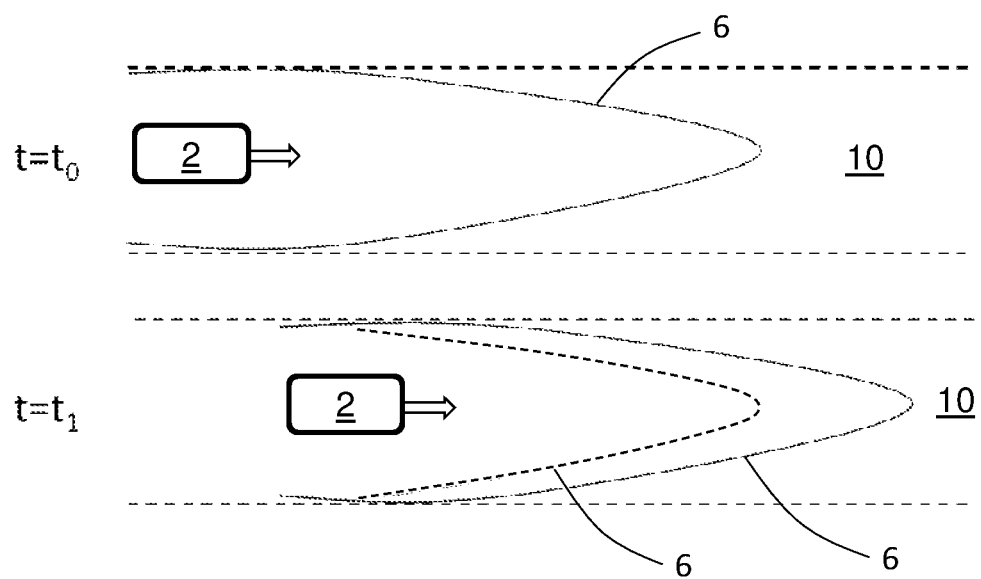
FIG. 1 is a schematic illustration of a retrospective and a current determination of drivable area for monitoring and adapting the performance of a fusion system according to embodiments herein.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The present disclosure proposes an improved method for monitoring and adapting the performance, and thus also safety, of a fusion system 1 of an autonomous road vehicle 2.

This is provided through a method for monitoring and adapting the performance of a fusion system 1 of an autonomous road vehicle 2 equipped with an autonomous drive system 3 comprising a positioning system 4, such as a satellite based positioning system 4, e.g. GPS, and multiple sensors 5 for supervising the internal state of the autonomous road vehicle 2 and the surrounding environment. Examples of sensors 5 for supervising the surrounding environment include radar, lidar and camera based sensors 5.

A fusion system 1 of an autonomous road vehicle 2, as used herein, designates different functions and algorithms that use sensor data to estimate information used for autonomous drive control of an autonomous road vehicle 2.

A localization function of the fusion system 1 is provided by fusing data from the positioning system 4 and the sensors 5. An environmental perception function of the fusion system 1 is provided by fusing data from the sensors 5 supervising the surrounding environment. The localization and environmental perception functions of the fusion system 1 are implemented using parallel algorithms based on alternative concepts and using different sets of sensor information. The parallel implementations enable self-monitoring, as the parallel algorithms can be used to monitor each other to detect sensor failures and algorithmic inconsistencies.

The method further comprises determining a drivable area 6 in front of the autonomous road vehicle 2 by combining the localization function and high density map 7 data for a current position.

The method still further comprises determining information on surrounding objects 8, where the information determination comprises determining the localization of the surrounding objects 8, classifying the surrounding objects 8, estimating their physical property states, and assigning them extension descriptions and a highly automated drive confidence.

Further, a self-driving road vehicle should be able to perform automatic lane changes, adapt to a current traffic flow and, in an emergency, brake urgently. Thus it uses accurate information about the surrounding environment, which is provided by fusing the different sensor observations.

Thus the method further comprises condensing information on the drivable area 6 and surrounding objects 8 into observed areas 9 and prioritized objects 8, specifying observed areas 9 as the volume around the autonomous road vehicle 2 that has been monitored by the sensors 5 of the environmental perception function with a predetermined degree of certainty, and representing prioritized objects 8 by classes, state estimates, extension descriptions and highly automated drive confidences.

As the fusion system 1 gathers more and more information from sensor observations, it becomes possible for it to evaluate its output from an earlier time when it had less information. Thus the method further comprises having the fusion system 1 monitor itself retrospectively.

According to the method the fusion system 1 monitors itself retrospectively by evaluating its current determinations of drivable area 6, prioritized objects 8 and observed areas 9 against its previous determinations thereof, and if a previous determination differ more than a predetermined amount from a current determination, adapting the fusion system 1 to account for that discrepancy. In this way the fusion system 1 will continuously improve the reliability of its determinations.

A previous determination, as used herein, can e.g. be at determination made a predetermined time before a current determination, e.g. such that the previous determination was made at a time t=$t_0$ to and a current determination at a time t=$t_1$, where the time period between $t_0$ and $t_1$ e.g. may be a fragment of a second. The previous determination may be retained in a memory of the fusion system 1, in order to enable comparison thereof with the current determination.

According to some embodiments herein, as illustrated in FIG. 1, it is provided that the drivable area 6 in front of the autonomous road vehicle 2 is determined as an area that belongs to a road traveled 10, which, given sensor and algorithmic uncertainties, is considered safe with a predetermined probability. This allows for efficient monitoring and adaptation of the fusion system 1 by comparing current and retrospective determinations of drivable area 6. The direction of travel of the autonomous road vehicle 2 is indicated in FIG. 1 by the associated arrow.

FIG. 1 illustrates how a determination of drivable area 6 in front of the autonomous road vehicle 2 made at the time $t_0$ in the upper part of the figure is compared and verified at a subsequent time $t_1$. As illustrated in the lower part of FIG. 1 the determination made at the time $t_0$ (dashed) is validated at the subsequent time $t_1$, i.e. the drivable area 6 at the time $t_0$ (dashed in the lower part of FIG. 1) is part of the drivable area 6 at the time $t_1$, and thus the reliability of the determination made at the time $t_0$ can be considered as high.

In further embodiments of the method it is provided that the determination of information on surrounding objects 8 comprises classifying surrounding objects 8 with respect to object types, estimating physical property states of surrounding objects 8 including their positions, velocities and accelerations, and assigning the surrounding objects 8 extension descriptions that include sensor uncertainty descriptions, and assigning the surrounding objects 8 a highly automated drive confidence. Object types used for the classification may include classes such as car, truck and bus. This provides basis for performing efficient comparisons and evaluations of surrounding objects 8.

Figure 2:
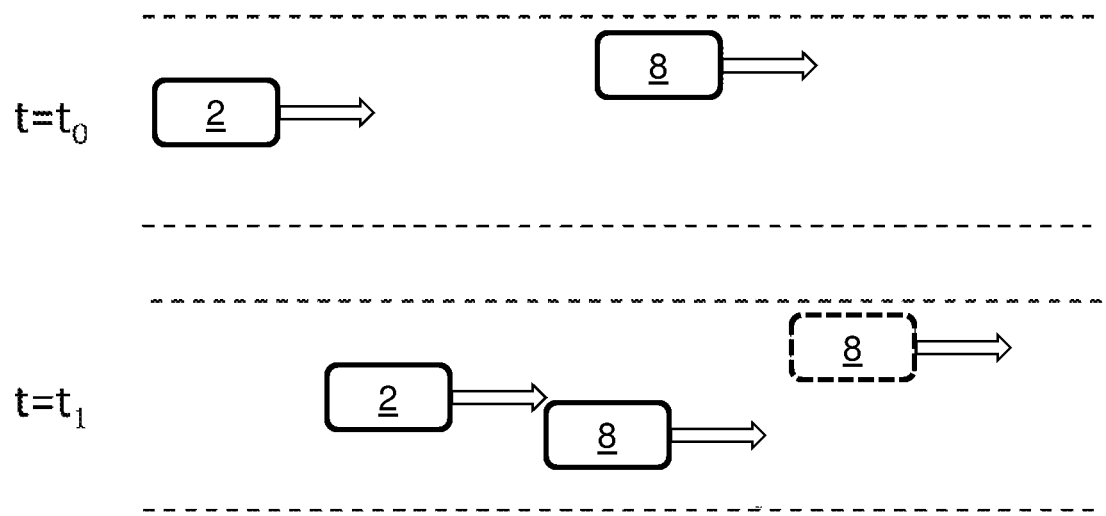
FIG. 2 is a schematic illustration of a retrospective and a current object representation for monitoring and adapting the performance of a fusion system according to embodiments herein.

FIG. 2 illustrates an example where an object representation at the time $t_1$ is not as would have been expected given an estimated state at the time $t_0$. The object 8 representation may differ in respect of positioning, as illustrated in FIG. 2, but also in respect of classification. In the lower part of FIG. 2, depicting the situation at the time $t_1$, the object 8 was not at the expected position (dashed) at the time $t_1$ given the estimated state at the time $t_0$. The directions of travel of the autonomous road vehicle 2 and the object 8 are indicated in FIG. 2 by the associated arrows. A threshold or equivalent can be used for determining how much a previous determination may be allowed to deviate from a current without necessitating distrusting the determination and initiating hand-over of control of the autonomous road vehicle 2 from the autonomous drive system 3 to a driver thereof. While below such a threshold it may suffice to increase an associated sensor uncertainty description, e.g. proportional to the magnitude of the deviation.

According to still some further embodiments the method further comprises determining if a current determination of a class of a prioritized object differs from a previously determined class of that prioritized object, and if so adapting the fusion system 1 by increasing a sensor uncertainty description associated with that previously determined class. Hereby is provided an efficient way of ascertaining the correctness of sensor determinations.

In yet some embodiments the method further comprises determining if a current localization determination of a prioritized object differ from a previous localization determination of that prioritized object more than what a reasonable estimate based on its previous representation would indicate but indicates a localization in a predetermined close vicinity thereto, e.g. using a distance threshold, and if so adapting the fusion system 1 by increasing a sensor uncertainty description associated with that prioritized object. This provides an efficient way of ascertaining the correctness of sensor based localization determinations.

According to still further embodiments the method further comprises determining if a current localization determination of a prioritized object differ from a previous localization determination of that prioritized object more than what a reasonable estimate based on its previous representation would indicate and not indicates a localization in a predetermined close vicinity thereto, e.g. using a distance threshold, and if so adapting the fusion system 1 by distrusting the fusion system 1 and initiating hand-over of control of the autonomous road vehicle 2 from the autonomous drive system 3 to a driver thereof. This provides an efficient way of determining and handling a fault in the fusion system 1.

In yet some embodiments the method comprises determining if a current determination of drivable area 6 indicates a different extension of the drivable area 6 than a previous determination thereof, and if so adapting the fusion system 1 such that future determinations of drivable area 6 are made based on the current determination. Hereby is provided an efficient way of improving the drivable area 6 determination.

The method, according to some further embodiments, comprises determining if a current determination of drivable area 6 indicates a more narrow width of the drivable area 6 than a previous determination thereof, and if so adapting the fusion system 1 such that future determinations of drivable area 6 are made based on a more narrow width of the drivable area 6 than that of the previous determination thereof. This provides an efficient way of improving the drivable area 6 determination in cases where a previous determination seemingly overestimated the width.

Conversely, according to still some further embodiments the method comprises determining if a current determination of drivable area 6 indicates a less narrow width of the drivable area 6 than a previous determination thereof, and if so adapting the fusion system 1 such that future determinations of drivable area 6 are made based on a less narrow width of the drivable area 6 than that of the previous determination thereof. This provides an efficient way of improving the drivable area 6 determination in cases where a previous determination seemingly underestimated the width.

An efficient way of determining and handling a fault in the fusion system 1 is, according to some further embodiments, provided through that the method comprises determining if a current determination of drivable area 6 indicates that the previously determined drivable area 6 was not drivable at all, and if so adapting the fusion system 1 by distrusting the localization function and initiating hand-over of control of the autonomous road vehicle 2 from the autonomous drive system 3 to a driver thereof.

Figure 3:
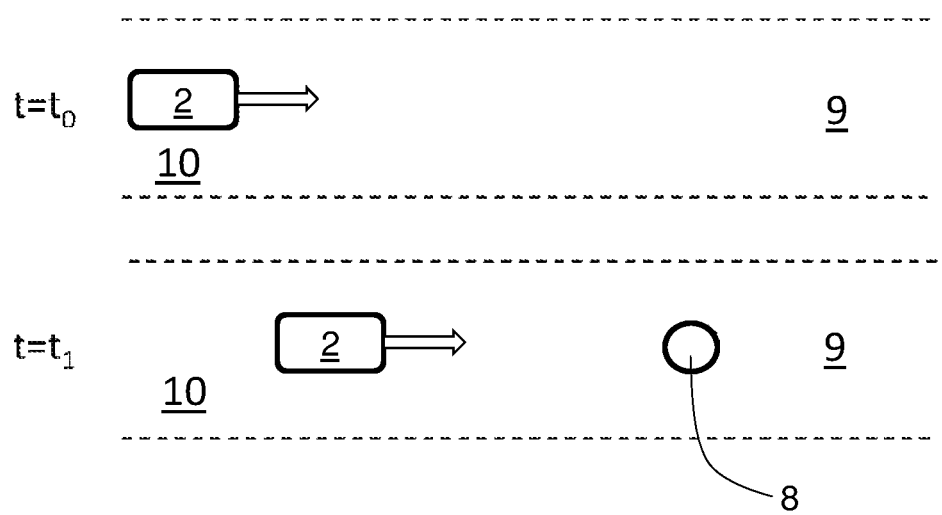
FIG. 3 is a schematic illustration of a retrospective and a current determination of observed area for monitoring and adapting the performance of a fusion system according to embodiments herein.

FIG. 3 illustrates how an object 8 is detected inside an observed area 9 in front of the autonomous road vehicle 2 at a time $t_1$ while a previous determination at the time $t_0$ indicated no such object 8, and no determination of that object 8 entering the observed area 9 from the border thereof has been made. In such a case, an efficient way of determining and handling a fault in the fusion system 1 is, according to some further embodiments, provided through that the method comprises determining if a current determination of surrounding objects 8 indicates that a new object 8 has appeared in an observed area 9 where it should have been determined previously, and if so adapting the fusion system 1 by distrusting the fusion system 1 and initiating hand-over of control of the autonomous road vehicle 2 from the autonomous drive system 3 to a driver thereof. The direction of travel of the autonomous road vehicle 2 is indicated in FIG. 3 by the associated arrow.

Still further, the present disclosure also proposes an improved arrangement for monitoring and adapting the performance of a fusion system 1 of an autonomous road vehicle 2. The fusion system 1 comprising one or more processing arrangements with associated data storage capabilities arranged to perform the different functions and algorithms that use sensor 5 data to estimate information use for autonomous drive control by the autonomous drive system 3 of the autonomous road vehicle 2.

Figure 4:
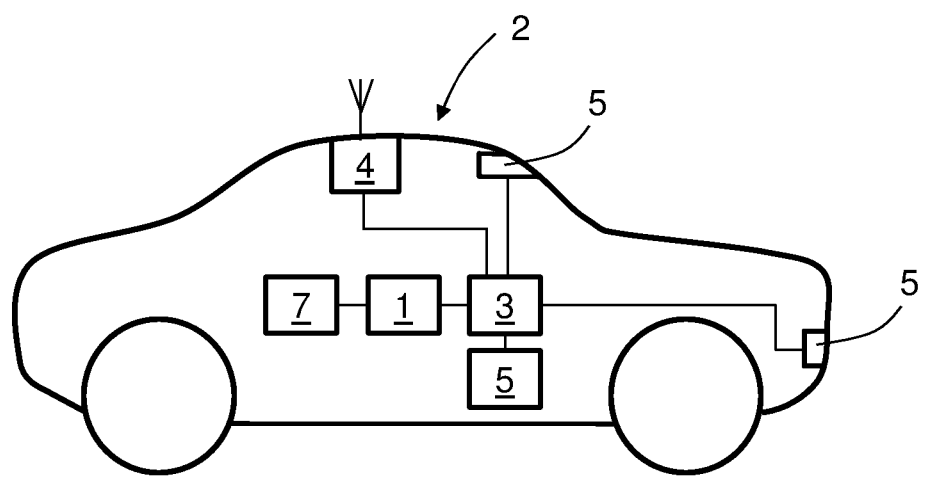
FIG. 4 is a schematic illustration of an autonomous road vehicle comprising an arrangement for monitoring and adapting the performance of a fusion system according to embodiments herein.

FIG. 4 illustrates schematically an autonomous road vehicle 2 comprising such an arrangement for monitoring and adapting the performance of a fusion system 1 of an autonomous road vehicle 2 equipped with an autonomous drive system 3 comprising a positioning system 4 and multiple sensors 5 for supervising the internal state of the autonomous road vehicle 2 and the surrounding environment.

In the arrangement a localization function of the fusion system 1 is provided by fusing data from the positioning system 4 and the sensors 5. An environmental perception function of the fusion system 1 is provided by fusing data from the sensors 5 supervising the surrounding environment.

The localization and environmental perception functions of the fusion system 1 are implemented using parallel algorithms based on alternative concepts and using different sets of sensor 5 information. The parallel implementations of the localization and environmental perception functions of the fusion system 1 are suitably arranged to enable a use thereof to monitor each other. Such monitoring is useful in order to be able to detect sensor 5 failures and algorithmic inconsistencies.

The arrangement further comprises the fusion system 1, being arranged to: determine a drivable area 6 in front of the autonomous road vehicle 2 by combining the localization function and high density map 7 data for a current position; determine information on surrounding objects 8, the information determination comprising determining the localization of the surrounding objects 8, classifying the surrounding objects 8, estimating their physical property states, and assigning them extension descriptions and a highly automated drive confidence; condense information on the drivable area 6 and surrounding objects 8 into observed areas 9 and prioritized objects 8, specifying observed areas 9 as the volume around the autonomous road vehicle 2 that has been monitored by the sensors 5 of the environmental perception function with a predetermined degree of certainty, and representing prioritized objects 8 by classes, state estimates, extension descriptions and highly automated drive confidences.

In order to improve the reliability of the fusion system 1 and decrease the risk of serious errors the fusion system 1 is further arranged to monitor itself retrospectively. This retrospective monitoring is performed by the fusion system 1 being arranged to evaluate its current determinations of drivable area 6, prioritized objects 8 and observed areas 9 against its previous determinations thereof. If a previous determination by the fusion system 1 differ more than a predetermined amount from a current determination, the fusion system 1 is arranged to adapt itself to account for that discrepancy.

Those skilled in the art will appreciate that the fusion system 1, vehicle 2, autonomous drive system 3, positioning system 4, sensors 5, map data 7, and/or any other function, unit, system, device or module described herein may comprise, in whole or in part, a combination of analog and digital circuits and/or one or more appropriately programmed processors (e.g., one or more microprocessors including central processing units (CPU)) and associated memory, which may include stored operating system software, firmware and/or application software executable by the processor(s) for controlling operation thereof and/or for performing the particular algorithms represented by the various functions and/or operations described herein, including interaction between and/or cooperation with each other. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip). Furthermore, the fusion system 1, autonomous drive system 3, positioning system 4, sensors 5, map data 7, and/or any other function, unit, system, device or module described herein may for instance be implemented in one or several arbitrary nodes comprised in the host vehicle. In that regard, such a node may comprise an electronic control unit (ECU) or any suitable electronic device, which may be a main or central node. It should also be noted that the fusion system 1, vehicle 2, autonomous drive system 3, positioning system 4, sensors 5, map data 7, and/or any other function, unit, system, device or module described herein may further comprise or be arranged or configured to cooperate with any type of storage device or arrangement known in the art, which may for example be used for storing data for map data 7. The fusion system 1, vehicle 2, autonomous drive system 3, positioning system 4, sensors 5, map data 7, and/or any other function, unit, system, device or module described herein may further comprise any computer hardware and software and/or electrical hardware known in the art configured to enable communication therebetween.

Finally, the present disclosure also proposes an autonomous road vehicle 2 that comprises an arrangement for monitoring and adapting the performance of a fusion system 1 of an autonomous road vehicle 2, as described above.

Further details of the autonomous road vehicle 2, such as propulsion system, steering system, brake system etc, are intentionally left out from FIG. 4, in order to no unnecessarily obscure details promoting the understanding of the arrangement according to the present disclosure. However, the person skilled in the art will readily be able to envisage such further details.

An autonomous road vehicle 2 as described above is able to rely on its fusion system 1 to monitor itself retrospectively, evaluating its current output against its output from an earlier time when it had less information, and adapting the performance of its fusion system 1 based thereupon.

The above-described embodiments may be varied within the scope of the following claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for monitoring and adapting the performance of a fusion system of an autonomous road vehicle equipped with an autonomous drive system comprising a positioning system and multiple sensors for supervising an internal state of the autonomous road vehicle and a surrounding environment, the method comprising:
   providing a localization function of the fusion system by fusing data from the positioning system and the sensors;
   providing an environmental perception function of the fusion system by fusing data from the sensors supervising the surrounding environment;
   implementing the localization and environmental perception functions of the fusion system using different algorithms in parallel and using different sets of sensor information;
   determining a drivable area in front of the autonomous road vehicle by combining the localization function and high density map data for a current position;
   determining information on surrounding objects, the information determination comprising determining localization of the surrounding objects, classifying the surrounding objects, estimating physical property states of the surrounding objects, and assigning the surrounding objects descriptions and an automated drive confidence;
   based on information on the drivable area and surrounding objects, determining observed areas and prioritized objects, wherein observed areas are specified as a volume around the autonomous road vehicle that has been monitored by the sensors with a predetermined degree of certainty, and prioritized objects are represented by classes, estimates of state, descriptions, an automated drive confidences; and
   having the fusion system monitor itself retrospectively by evaluating its current determinations of drivable area, prioritized objects and observed areas against its previous determinations thereof, and in response to a previous determination differs more than a predetermined amount from a current determination, adapting the fusion system to account for that discrepancy.

2. The method according to claim 1 wherein the drivable area in front of the autonomous road vehicle is determined as an area that belongs to a road traveled, which, given sensor and algorithmic uncertainties, is considered safe with a predetermined probability.

3. The method according to claim 1 wherein the determination of information on surrounding objects comprises classifying surrounding objects with respect to object types, estimating physical property states of surrounding objects including their positions, velocities and accelerations, and assigning the surrounding objects descriptions that include sensor uncertainty descriptions.

4. The method according to claim 3 further comprising determining that a current determination of a class of a prioritized object differs from a previously determined class of that prioritized object, and adapting the fusion system by increasing a sensor uncertainty description associated with that previously determined class.

5. The method according to claim 3 further comprising determining that a current localization determination of a prioritized object differs from a previous localization determination of that prioritized object by more than a threshold amount from an estimate based on its previous representation but indicates a localization in a predetermined close vicinity thereto, and adapting the fusion system by increasing a sensor uncertainty description associated with that prioritized object.

6. The method according to claim 1 further comprising determining that a current localization determination of a prioritized object differs from a previous localization determination of that prioritized object by more than a threshold amount from an estimate based on its previous representation and does not indicate a localization in a predetermined close vicinity thereto, and adapting the fusion system by distrusting the fusion system and initiating hand-over of control of the autonomous road vehicle from the autonomous drive system to a driver thereof.

7. The method according to claim 1 further comprising determining that a current determination of drivable area indicates a different extension of the drivable area than a previous determination thereof, and adapting the fusion system such that future determinations of drivable area are made based on the current determination.

8. The method according to claim 7 further comprising determining that a current determination of drivable area indicates a more narrow width of the drivable area than a previous determination thereof, and adapting the fusion system such that future determinations of drivable area are made based on a more narrow width of the drivable area than that of the previous determination thereof.

9. The method according to claim 7 further comprising determining that a current determination of drivable area indicates a less narrow width of the drivable area than a previous determination thereof, and adapting the fusion system such that future determinations of drivable area are made based on a less narrow width of the drivable area than that of the previous determination thereof.

10. The method according to claim 1 further comprising determining that a current determination of drivable area indicates that the previously determined drivable area was not drivable, and adapting the fusion system by distrusting the localization function and initiating hand-over of control of the autonomous road vehicle from the autonomous drive system to a driver thereof.

11. The method according to claim 1 further comprising determining that a current determination of surrounding objects indicates that a new object has appeared in an area where the new object was not determined previously, and adapting the fusion system by distrusting the fusion system and initiating hand-over of control of the autonomous road vehicle from the autonomous drive system to a driver thereof.

12. An arrangement for monitoring and adapting the performance of a fusion system of an autonomous road vehicle equipped with an autonomous drive system comprising a positioning system and multiple sensors for supervising an internal state of the autonomous road vehicle and a surrounding environment, the arrangement comprising:
   a localization function provided by fusing data from the positioning system and the sensors;
   an environmental perception function provided by fusing data from the sensors supervising the surrounding environment;
   wherein the localization and environmental perception functions are implemented using different algorithms in parallel and using different sets of sensor information;
   wherein the fusion system is configured to
      determine a drivable area in front of the autonomous road vehicle by combining the localization function and high density map data for a current position;

determine information on surrounding objects, the information determination comprising determining localization of the surrounding objects, classifying the surrounding objects, estimating physical property states of the surrounding objects, and assigning the surrounding objects descriptions and an automated drive confidence;

based on information on the drivable area and surrounding objects, determine observed areas and prioritized objects, wherein observed areas are specified as a volume around the autonomous road vehicle that has been monitored by the sensors with a predetermined degree of certainty, and prioritized objects are represented by classes, estimates of state, descriptions, and automated drive confidences; and monitor itself retrospectively by evaluating its current determinations of drivable area, prioritized objects and observed areas against its previous determinations thereof, and in response to a previous determination that differs more than a predetermined amount from a current determination, adapt the fusion system to account for that discrepancy.

13. An autonomous road vehicle comprising the arrangement according to claim 12.

* * * * *